though the hydrolysis of the glycide di- and polyglycerine as undesired byproducts. The presence of these materials considerably increases the difficulty of obtaining pure glycerine. In the use of hydrogen peroxide for the epoxidation considerable difficulties are caused by the quantitative recovery of pure tungstate catalyst. Besides there is always formed as a byproduct acrolein which is capable of yield reducing secondary reactions.

3,784,568
PROCESS FOR THE PRODUCTION OF GLYCERINE DIESTERS AND GLYCERINE(II)

Axel Kleemann, Oberursel, Gerd Schreyer, Grossauheim, Otto Weiberg, Neu-Isenburg, and Wolfgang Weigert, Offenbach am Main, Germany, assignors to Deutsche Gold- und Silber-Scheideanstalt vormals Roessler, Frankfurt am Main, Germany
No Drawing. Filed Aug. 7, 1970, Ser. No. 62,183
Claims priority, application Germany, Aug. 30, 1969, P 19 44 119.1
Int. Cl. C07c 29/02, 67/00
U.S. Cl. 260—491                10 Claims

ABSTRACT OF THE DISCLOSURE

Glycerine is produced by reacting allyl acetate with peracetic acid in the presence of acetic acid at elevated temperature. The diacetin formed is converted to glycerine by alcoholysis after removal of the unreacted allyl acetate and the acetic acid. Higher peraliphatic acids can be used in a similar manner.

---

It is the object of the present invention to develop a process for obtaining pure, high percentage glycerine.

It is known according to German Auslegeschrift 1,222,028 and French Pats. 1,509,277 and 1,509,278 to obtain synthetic glycerine by the reaction of allyl alcohol with peracetic acid. In such procedures there is first formed glycide which is hydrolyzed to glycerine with a large excess of water. There are also described processes in which allyl alcohol in very dilute aqueous solutions is epoxidized or hydroxylated with hydrogen peroxide in the presence of tungstic acid or its derivatives as catalysts (for example see German Pat. 1,212,056). These processes, however, have a number of disadvantages. Thus, there is formed in the course of the epoxidation from glycide and excess allyl alcohol noteworthy amounts of glycerine allyl ether and in the hydrolysis of the glycide di- and polyglycerine as undesired byproducts. The presence of these materials considerably increases the difficulty of obtaining pure glycerine. In the use of hydrogen peroxide for the epoxidation considerable difficulties are caused by the quantitative recovery of pure tungstate catalyst. Besides there is always formed as a byproduct acrolein which is capable of yield reducing secondary reactions.

It has now been found that these disadvantages can be avoided if one begins with allyl acetate and reacts this with an anhydrous solution of peracetic acid in acetic acid at elevated temperatures whereby diacetin is obtained directly by way of the intermediate step of forming glycidyl acetate. The diacetin is separated from unreacted allyl acetate as well as acetic acid by distillation and then is transesterified to glycerine with aliphatic or alicyclic alcohols.

The new process goes according to the following reaction scheme.

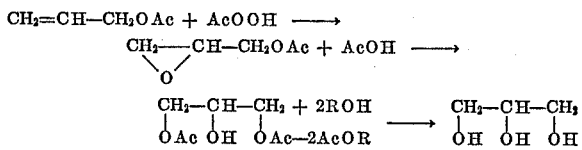

In the reaction scheme AC is the acetyl radical CH₃CO— and R is the residue of an alcohol, e.g., an alkyl or cycloalkyl group.

The reactants (allyl acetate and peracetic acid) can be employed in equivalent amount. Preferably the allyl acetate is employed in excess. The best results were obtained at a mole ratio allyl acetate:peracetic acid 1.5–5.0:1. However, the molar proportions can be varied within any desired boundaries.

The peracetic acid solution is preferably employed in a concentration such that there are present in the reaction mixture 3–12 mols of acetic acid per mol of peracetic acid. However, the concentration in itself can vary within wide boundaries. Higher mixing proportions, i.e., a lower concentration of peracetic acid only reduces the capacity of the equipment. The reaction is carried out in the liquid phase.

The reaction temperature normally is between 30 and 90° C., preferably between 40 and 90° C. Higher temperatures are detrimental since beginning with 100° C. there occurs larger active oxygen losses through decomposition of the peracetic acid. The reaction times are very strongly dependent upon the temperatures employed amounting to 2–20 hours. At 60° C. the reaction time amounts to 4–8 hours.

If the reaction mixture after complete reaction of the peracetic acid still contains small amounts of glycidyl acetate, this is converted completely into diacetin by a brief heating to 60–120° C.

After the finish of the reaction the excess allyl acetate as well as the acetic acid is separated by distillation, preferably under reduced pressure, e.g., 20 to 400 torr and the diacetin is recovered as a residue. The thus produced diacetin, which in a given case can also be used as such, occasionally contains small amounts of mono and tri-acetin arising from transacylation. However, the degree of purity generally amounts to over 90%. The yields of this one step process for the production of diacetin are substantially increased in comparison to known methods and are over 90% of theory based on the allyl acetate.

If it is desired to convert the diacetin to glycerine alcoholysis is accomplished by the addition of any desired saturated or unsaturated aliphatic or alicylic alcohol in excess, e.g., 2 to 20 mols per mol of diacetin. Examples of such alcohols are methyl alcohol, ethyl alcohol, isopropyl alcohol, propyl alcohol, butyl alcohol, sec. butyl alcohol, t-butyl alcohol, amyl alcohol, hexyl alcohol, octyl alcohol, 2-ethylhexyl alcohol, decyl alcohol, cyclohexanol, cyclopentanol, allyl alcohol, crotyl alcohol, ethylene glycol, propylene glycol, etc. The use of methanol has proven advantageous since the reaction takes place very smoothly and because of its lower boiling point is also sparing in materials. The alcoholysis proceeds almost quantitatively and without side reactions with almost all known transesterification catalysts such as inorganic acids and bases, metal alcoholates, acidic, basic and neutral salts, for example, sulfuric acid, hydrochloric acid, phosphoric acid, sodium hydroxide, potassium hydroxide, sodium carbonate, p-toluene sulfonic acid, benzene sulfonic acid, triethyl amine, dimethylaniline, sodium methylate, sodium ethylate, potassium acid sulfate as well as cation exchange and anion exchangers.

The catalyst is usually employed in an amount of 0.1 to 10% of the diacetin but the exact amount is not critical. The methyl acetate arising in the course of the reaction advantageously is constantly distilled off from the reaction mixture as an azeotrope with methanol over a suitable column. After separation of the catalyst by filtration or ion exchange and the excess methanol, for example in a thin layer evaporator, there is obtained a pure, anhydrous glycerine, that can be rectified in vacuum for the highest purity requirements. The methyl acetate formed can be hydrolyzed in known manner to methyl alcohol and acetic acid and again supplied to the process.

In the production of glycerine diacetin in unpurified form along with both other acetins can also be employed. Special separation of both of these other acetins is naturally not necessary.

The technical advance of the process of the invention is first the possibility to immediately obtain a relatively pure diacetin in a one-step process which can be freed of excess reactants as well as reaction media and byproducts by known methods. Furthermore, the diacetin so obtained can be changed into glycerine of high purity and in good yields by simple alcoholysis.

In the same manner as peracetic acid the higher aliphatic percarboxylic acids and the corresponding allyl esters can be used to form the bis-carboxylic acid esters of glycerine. Thus, peralkanoic acids of 3–5 carbon atoms and the corresponding allyl alkanoates can be used such as perpropionic acid and allyl propionate to form glyceryl dipropionate, perbutyric acid and allyl butyrate to form glyceryl dibutyrates, perisobutyric acid and allyl isobutyrate to form glyceryl diisobutyrate and pervaleric acid and allyl valerate to form glyceryl divalerate.

The invention will be further illustrated by the following examples.

Unless otherwise indicated, all parts and percentages are by weight.

EXAMPLE 1

In the course of an hour at 60° C., there were added dropwise to a solution of 4.0 mols of allyl acetate in 600 grams of acetic acid 2.0 mols of peracetic as a 28.1% solution in acetic acid. After 8 hours at 60° C. and a further 2 hours at 80° C., the reaction mixture was fractionated in a vacuum, whereby there were obtained 330 grams of diacetin (B.P.$_{0.7}$ 112° C.; $n_D^{22.5}$ 1.4380) that contained only small amounts of mono and triacetin. The yield amounted to 93.6% of theory based on the peracetic acid employed.

EXAMPLE 2

A mixture of 4 mols of allyl acetate and 400 grams of acetic acid were reacted with 2 mols of peracetic acid in the form of a 28.1% solution in acetic acid at 70° C. in a manner analogous to Example 1. After 5.0 hours the peracetic acid was completely reacted and the reaction mixture contained only 3.5% of the theoretical amount of glycidyl acetate. This was completely converted into diacetin by further heating for 1 hour at 90° C. Then excess allyl acetate and acetic acid were distilled off under reduced pressure. The residue consisted of nearly colorless diacetin and was transesterified after addition of 480 grams of methanol and 0.2 weight percent of p-toluene sulfonic acid in the course of 3 hours. The methyl acetate formed during the transesterification was continuously removed from the reaction mixture by distilling as an azeotrope with methanol over a suitable column (B.P. 53.5° C., 19% methanol). After the reaction the catalyst was removed with a basic ion exchanger and the methanol volatilized. Through distillation of the residue in a vacuum there were obtained 136.3 grams of pure glycerine, which corresponds to a yield of 74% of theory based on the peracetic acid added.

EXAMPLE 3

6 mols of allyl acetate in 600 grams of acetic acid were reacted with 2 mols of peracetic acid in the form of a 28.1% solution in acetic acid at 55° C. in a manner analogous to Example 2. After 10 hours at 55° C. and 2 hours at 90° C., the reaction was complete. After working up an alcoholysis as in Example 2, there was obtained 151.0 grams of pure glycerine corresponding to a yield of 82% of theory based on the peracetic acid employed.

EXAMPLE 4

4 mols of allyl acetate in 400 grams of acetic acid were reacted with 2 mols of peracetic acid in the form of a 36.1% solution in acetic acid in a manner analogous to Example 2. After 8 hours at 60° C. and 2 hours at 80° C., the reaction was finished. By working up and transesterifying as in Example 2, there were obtained 167.5 grams of pure glycerine. This corresponds to a yield of 91% of theory based on the peracetic acid employed.

What is claimed is:

1. A process for producing a glycerine diester of a lower alkanoic acid having at least 2 carbon atoms comprising heating under anhydrous conditions at a temperature of 30° C. to 90° C. an allyl lower alkanoate having at least 2 carbon atoms in the alkanoate group with a lower peralkanoic acid having at least 2 carbon atoms in the presence of an alkanoic acid having at least 2 carbon atoms.

2. A process according to claim 1 wherein the molar ratio of allyl lower alkanoate to lower peralkanoic acid is from 1.5 to 5.0:1 and the molar proportion of lower alkanoic acid to lower peralkanoic acid is from 3 to 12:1.

3. A process according to claim 2 including the additional step of converting the diacetin to glycerine by alcoholysis with an aliphatic or alicyclic alcohol.

4. A process according to claim 1 including the further step of converting the glycerine diester to glycerine by alcoholysis with an aliphatic or alicyclic alcohol.

5. A process according to claim 1 wherein diacetin is formed by heating allyl acetate with peracetic acid and acetic acid.

6. A process according to claim 5 wherein the temperature is 40–90° C.

7. A process according to claim 5 wherein the molar ratio of allyl acetate to peracetic acid is from 1.5 to 5.0:1.

8. A process according to claim 5 wherein the molar ratio of acetic acid to peracetic acid is from 3 to 12:1.

9. A process according to claim 8 wherein the temperature is 40 to 90° C. and the molar ratio of allyl acetate to peracetic acid is from 1.5 to 5.0:1.

10. A process according to claim 9 including the additional step of converting the diacetin to glycerine by alcoholysis with methanol.

References Cited

UNITED STATES PATENTS

| | | | |
|---|---|---|---|
| 2,911,437 | 11/1959 | Keith | 260—491 |
| 3,517,054 | 6/1970 | Ketley | 260—491 |
| 2,492,201 | 12/1949 | Swern et al. | 260—635 H |
| 2,776,301 | 1/1957 | Payne et al. | 260—635 H |
| 3,454,655 | 7/1969 | Liao | 260—635 H |
| 3,609,198 | 9/1971 | Yamagishi et al. | 260—635 H |
| 2,500,599 | 3/1950 | Bergsteinsson et al. | 260—488 J |
| 2,739,173 | 3/1956 | Corey et al. | 260—635 H |
| 2,373,942 | 4/1945 | Bergsteinsson | 260—635 H |
| 2,813,910 | 11/1957 | Ijepkema | 260—491 |

OTHER REFERENCES

Chemistry of Carboxylic Acids and Esters, Interscience Publications, 1969, pp. 670–671.

VIVIAN GARNER, Primary Examiner

U.S. Cl. X.R.

260—615 R, 635 H